United States Patent
Laurent

(10) Patent No.: US 7,435,071 B2
(45) Date of Patent: Oct. 14, 2008

(54) CLOSURE UNIT FOR AN INJECTION MOULDING DEVICE

(75) Inventor: Michel Laurent, La Motte Servolex (FR)

(73) Assignee: Maplan maschinen und Technische Anlagen, Planungs-und Fertigungs-Ges, m.b.H., Ternitz (AT)

( * ) Notice: Subject to any disclaimer, the term of this patent is extended or adjusted under 35 U.S.C. 154(b) by 278 days.

(21) Appl. No.: 11/159,726

(22) Filed: Jun. 23, 2005

(65) Prior Publication Data
US 2005/0287245 A1    Dec. 29, 2005

(30) Foreign Application Priority Data
Jun. 26, 2004   (EP) ................................. 04015074

(51) Int. Cl.
*B29C 45/64* (2006.01)
(52) U.S. Cl. ............... 425/190; 425/595; 425/451.9
(58) Field of Classification Search ............... 425/190, 425/192 R, 595, 451.9
See application file for complete search history.

(56) References Cited

U.S. PATENT DOCUMENTS

| 2,718,663 | A |   | 9/1955 | Roger et al. | |
| 3,270,372 | A | * | 9/1966 | Hesse | 425/451.2 |
| 3,669,593 | A | * | 6/1972 | Cyriax | 425/186 |
| 3,687,590 | A | * | 8/1972 | Cyriax | 425/450.1 |
| 3,716,323 | A | * | 2/1973 | Classen | 425/451.2 |
| 3,768,953 | A | * | 10/1973 | Dangremond et al. | 425/451.2 |
| 3,905,741 | A | * | 9/1975 | Poncet | 425/450.1 |
| 4,759,280 | A | * | 7/1988 | Malashenko | 425/450.1 |
| 4,875,849 | A |   | 10/1989 | Huang et al. | |
| 6,872,066 | B2 | * | 3/2005 | Wernz | 425/451.9 |

FOREIGN PATENT DOCUMENTS

| DE | 1006590 | 6/1961 |
| DE | 1912240 | 9/1970 |
| DE | 1815712 | 3/1972 |
| DE | 101 00 001 C | 5/2002 |

* cited by examiner

*Primary Examiner*—James Mackey
(74) *Attorney, Agent, or Firm*—Lucas & Mercanti, LLP

(57) ABSTRACT

A clamping unit includes two fixed platens, kept at a distance by tie bars, a platen which can be displaced in relation to the fixed platens, part of an injection mold respectively being arranged on one of the fixed platens and on the displaceable platen, a force generating element to be arranged between the one fixed platen and the displaceable platen, and the tie bars being arranged in vertical alignment. The force generating element is fastened to the displaceable platen and that on the one fixed platen there is arranged a locking element which forms a stop for the force generating element on the one fixed platen or exposes an opening for at least part of the force generating element to enter or pass through the one fixed platen.

10 Claims, 2 Drawing Sheets

CLOSURE UNIT FOR AN INJECTION MOULDING DEVICE

BACKGROUND OF THE INVENTION

1. Field of Invention

The invention relates to a clamping unit for an injection-molding device for processing thermoplastic, thermosetting or elastomeric material, in which there is arranged between two fixed platens, kept at a distance by means of tie bars, a platen which can be displaced in relation to said fixed platens, part of an injection mold respectively being arranged on one of the fixed platens and on the displaceable platen, it being possible for a force generating element, which generates the clamping force, to be arranged between the one fixed platen and the displaceable platen, and the tie bars being arranged in vertical alignment.

2. Related Prior Art

A clamping unit for an injection-molding machine of this type is known for example from U.S. Pat. No. 4,875,849. The machine described there, for the fabrication of rubber products, is what is known as a vertical machine, i.e. the closing movement of the mold takes place vertically. As a result, an altogether space-saving solution is achieved, since the base area of the machine is relatively small in comparison with horizontal machines, in the case of which a horizontal displacement movement takes place during the opening and closing of the injection mold.

In the case of the aforementioned injection-molding machine according to U.S. Pat. No. 4,875,849, the two-part injection mold is arranged in the upper region of the machine, part of the mold performing said vertical movement during the opening and closing. In order to apply the clamping force for clamping the mold together during the injection of rubber material, a hydraulic piston-cylinder system is arranged in the lower part of the machine. The clamping force required means that the force generating element is of a not inconsiderable size, so that, for ergonomically favorable operation, either the machine has to be arranged in a pit in the floor of the machine shop or the operator has to work on a platform.

To reduce these disadvantages, there are known solutions in which the force generating element for applying the clamping force—usually designed as a hydraulic piston-cylinder system—is not fixedly arranged in the injection-molding machine, but can perform a displacing movement transversely to the closing direction of the mold.

DE-A 18 15 712 discloses an injection-molding machine in which the entire force generating unit can be moved out from the interior of the injection-molding machine, defined by the machine tie bars, perpendicularly to the direction of the closing movement by means of a movement element. This makes it possible during the opening and closing of the mold to perform the required opening stroke of the mold without the force generating unit getting in the way.

A similar solution is disclosed by DE-A 19 12 240, DE-C 1 006 590 and DE 101 00 001 C1.

In the solution of the last-mentioned document, it is provided that, for opening the injection mold, the force generating unit is pivoted out from the interior region of the machine, so that the displaceable platen can move down unhindered.

All these solutions which operate with an extendable force generating unit have disadvantages, which have an effect in particular in the production of molded parts from elastomers on vertical machines:

The extending and retracting of the force generating unit transversely to the closing direction of the mold means that large masses are displaced, which on account of the required production rate of the machine results in mass forces which lead to considerable dynamic problems. Since the moving time of the force generating unit has a direct influence on the cycle time of the machine, and consequently on its productivity, a high degree of sophistication is necessary for the control technology to handle the mass forces, which leads to correspondingly expensive constructions.

Furthermore, said mass forces and the transverse accelerations which act on the force generating unit result in vibrations which are harmful in particular to the sealing systems of the hydraulic components. Therefore, the service life of such systems is shorter than would be the case without vibrations.

It is disadvantageous furthermore that, in solutions of this type, the support of the displaceable platen is restricted to the diameter of the piston of the force generating element, which is negative with regard to the deformation behavior of the mold and the entire machine.

Solutions which operate with an extendable pressure piece in one of the fixed platens have also become known, the pressure piece interacting with a pressure pad which applies the clamping force. Apart from the fact that these are relatively expensive constructions, the operating height which can be achieved with them is still not sufficiently low. Furthermore, the displaceable platen is in this case only supported locally against deflection, so that the mold is not held together with the support over a large area that is in fact desired.

SUMMARY OF THE INVENTION

In the light of the aforementioned prior art, the invention is therefore based on the object of providing a clamping unit for a vertical injection-molding machine which no longer has the disadvantages mentioned. The aim is therefore to provide a construction which is of a simple form, and consequently can be produced inexpensively, and which ensures that the operating height of the vertical machine is sufficiently low, so that neither pits in the shop floor nor platforms for the machine operator are required. Furthermore, the displaceable platen is to be optimally supported, so that its deflection can be minimized. Finally, it is intended to make it possible to dispense with a transverse movement of the force generating element, so that its sealing systems in particular are subjected to less stress and the unit has a long service life.

This object is achieved according to the invention by a solution wherein the force generating element is fastened to the displaceable platen and wherein on the one fixed platen there is arranged a locking element which, in a controlled manner, either forms a stop for the force generating element on the one fixed platen or exposes an opening for at least part of the force generating element to enter or pass through the one fixed platen.

The force generating element is preferably formed as a hydraulic piston-cylinder system. In this case, it is provided in particular that the cylinder of the force generating element is connected to the displaceable platen and that the piston of the force generating element extends vertically downward in the axial direction of the force generating element. Furthermore, the end of the piston arranged at the bottom in the vertical direction may be formed for bearing against the stop of the locking element. With this configuration, a favorable introduction of force into the displaceable platen is ensured.

The locking element may take the form of a plate and be mounted displaceably in the horizontal direction in a guide.

The locking element is advantageously able to be moved between a closed position and an opened position by driving means. In the closed position, the locking element forms the stop for the force generating element to bear against, so that the clamping force between the one fixed platen and the displaceable platen can be applied. In the opened position, on the other hand, the opening for at least part of the force generating element to enter or pass through the one fixed platen is exposed, so that the force generating element can enter the fixed platen or pass through it. In this case, the driving means may take the form of electric driving means. Alternatively, the driving means take the form of hydraulic driving means. The driving means are preferably formed for moving into the closed position or the opened position in a speed-controlled and/or position-controlled manner.

To allow extremely different mold mounting heights to be set, a development provides that the locking element is composed of at least two detachable part-elements, so that the effective height of the locking element, measured in the vertical direction, can be changed.

According to a further refinement of the invention, the displaceable platen is equipped with means for cooling.

With the proposal provided by the invention, the object on which it is based is achieved to the full extent, i.e. the correspondingly formed clamping unit for an injection-molding machine has various advantages:

The construction of the machine is much simpler than comparable systems, so that the machine can be produced inexpensively.

The operating height for the machine operator is sufficiently low, so that it is possible to dispense with pits in the shop floor or platforms for the operator.

The support of the displaceable platen is optimal, so that there is little bending of the plate, which positively influences the interaction of the mold halves. Moreover, the hydraulic pressure is applied as an equal load.

The displacement of the locking element can be accomplished very easily, because it is technically simple.

The force generating unit, i.e. in particular the hydraulic piston-cylinder system, is not exposed to any transverse accelerations or vibrations, so that a long service life is ensured for the unit.

BRIEF DESCRIPTION OF THE DRAWINGS

An exemplary embodiment of the invention is represented in the drawing, in which.

DETAILED DESCRIPTION OF THE INVENTION

Figure 1:
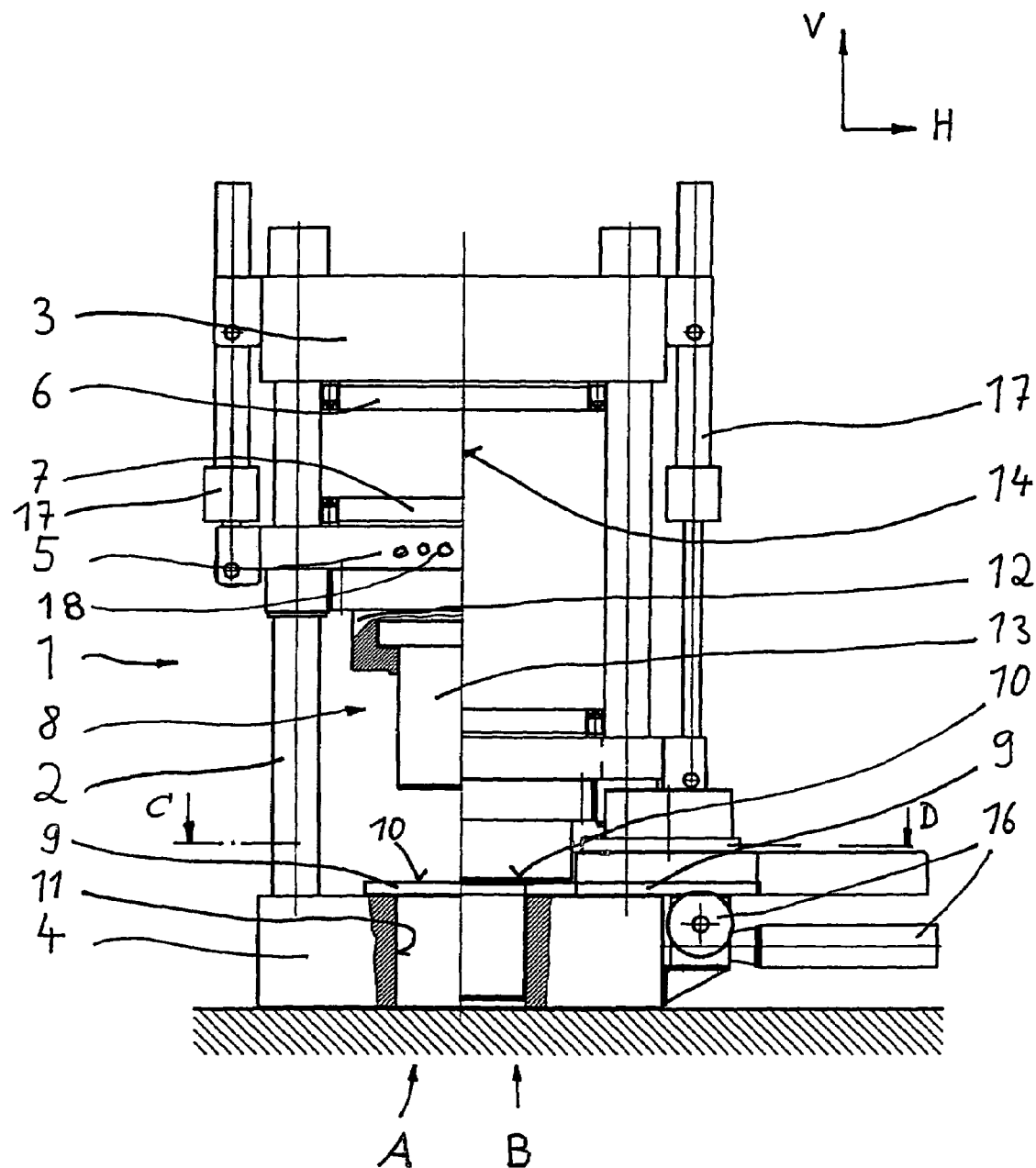
FIG. 1 schematically shows the clamping unit of an injection-molding machine in a view from the front and FIG. 2 shows the section C-D according to FIG. 1.

In the figures, a clamping unit 1 of an injection-molding machine can be seen. FIG. 1 shows the basic construction of the clamping unit 1 with two fixed platens 3 and 4 (upper platen 3 and lower platen 4), which are kept at a distance by four tie bars 2. The tie bars 2 are vertically arranged (vertical direction V), so that the clamping unit or the injection-molding machine formed from it is configured as a vertical machine.

Arranged between the two fixed platens 3, 4, guided on the tie bars 2, is a displaceable platen 5. One or more movement elements 17 move the displaceable platen 5 in the vertical direction V corresponding to the requirements of the injection-molding process. Arranged on the underside of the upper fixed platen 3 and on the upper side of the displaceable platen 5 there is respectively half 6 and 7 of an injection mold. If the displaceable platen 5 is moved into its uppermost position, the mold 6, 7 is closed and ready for carrying out the injection-molding process. In the moved-down position of the displaceable platen 5, the two mold halves 6, 7 are separate and the mold 6, 7 is open for the removal of injection-molded parts.

It should be noted that, in the left half of FIG. 1, the state in which the mold 6, 7 is largely closed is diagrammatically shown, while the right half of FIG. 1 shows the open mold 6, 7.

The movement elements 17 are designed in such a way that the mold opening and closing movement can be carried out quickly. However, the mold clamping force required for holding the mold 6, 7 together cannot be applied by these elements. A force generating element 8 in the form of a hydraulic piston-cylinder system is provided for this. The force generating element 8 in this case comprises a cylinder 12, which has an axial direction 14 which corresponds to that of the clamping unit 1 as a whole, i.e. the cylinder 12, and consequently the force generating element 8, is arranged as a single element centrally in the clamping unit 1. As can also be seen, the cylinder 12 is fixedly fastened to the displaceable platen 5 and moves up and down with the latter when there is vertical movement of the platen 5.

A piston 13 is arranged in the cylinder 12 of the force generating element 8. By being appropriately subjected to hydraulic fluid, it is possible for the piston 13 to be moved out of or into the cylinder 12.

Figure 2:
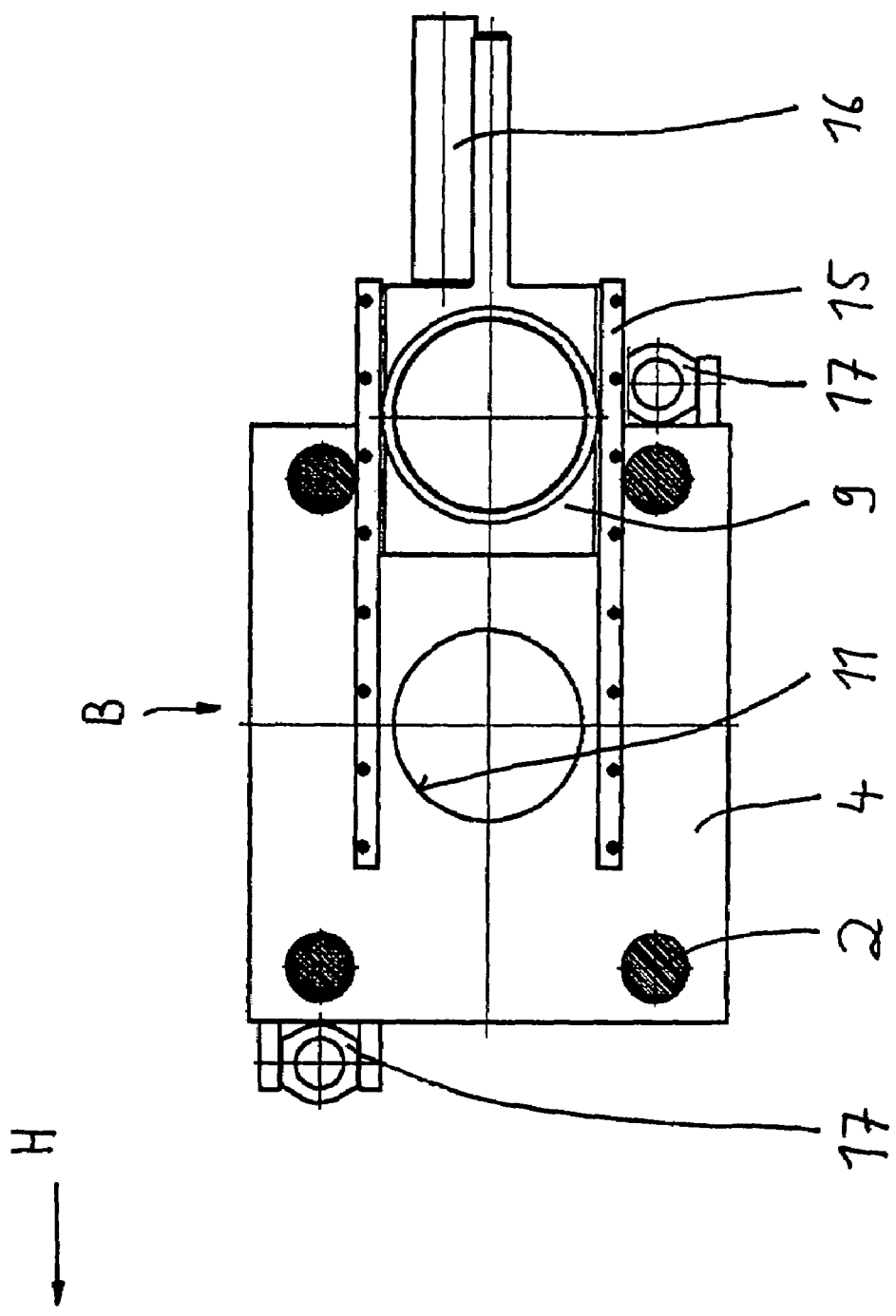

In order to apply the clamping force for clamping the mold 6, 7, the following procedure is adopted:

Arranged on the upper side of the lower fixed platen 4 is a locking element 9, which is displaceably arranged perpendicularly in relation to the closing movement V, that is in the horizontal direction H. As can be seen in FIG. 2, guides 15 are provided, allowing a translatory movement of the locking element 9 in the horizontal direction H. The displacement of the locking element 9 is accomplished by only very schematically indicated driving means 16.

In the lower fixed platen 4, an opening 11 is arranged centrically in the form of a bore for entry of the piston 13 of the force generating element. This opening 11 is dimensioned such that the piston 13 can enter the fixed platen 4 vertically downward, achieving the effect that, in spite of a sufficient opening stroke of the mold, an altogether low overall height of the clamping device 1, and in particular a low operating height, is achieved.

The locking element 9 is positioned in such a way that—in the closed position designated by A in FIG. 1—on the one hand it covers the opening 11 and so prevents the entry of the piston 13. In the other position—which in FIG. 1 is designated by B and defines the opened position—the locking element 9 exposes the opening 11, so that the piston 13 can enter the platen 4 or pass through the platen 4.

In the closed position A, the locking element 9 forms on its upper side a stop 10, which represents a rest for the piston 13. When the clamping force is applied to the mold 6, 7 and when the locking element 9 is pushed over the opening 11, the piston 13 comes to bear against the stop 10, so that the clamping force can be applied; the locking element 9 therefore transfers the clamping force from the piston 13 to the fixed platen 4.

For opening the mold 6, 7, the locking element 9 is moved back into the opened position B diagrammatically shown in FIG. 2, so that then the opening 11 is exposed and the piston 13 can enter it.

The comparison of the left half of FIG. 1 with the right half of the figure reveals that, in spite of the considerable opening stroke of the clamping unit 1, there is a small overall vertical height of the clamping unit and, in particular, the operating height remains low. The clamping unit therefore does not have to be accommodated in a pit in the floor of the machine shop and it is generally also possible to do without a platform for the machine operator.

Not shown any more specifically is that the locking element 9 may be constructed from a number of plate parts which are arranged one above the other in the vertical direction V. For setting to a desired mold height, plate parts can then be removed or added, in order to allow the optimum mounting height for a specific mold 6, 7 with a defined mold height to be easily achieved.

The clamping device 1 represented is used in particular in injection-molding machines in which rubber material (elastomers) is processed.

While the exemplary embodiment shows a force generating element 8 in the form of a hydraulic system, the principle of the invention is also equally used in the case of other clamping systems, for example in the case of mechanical force generating elements in the form of toggle levers.

The clamping unit of this invention can be defined, using the character references, as follows:

A clamping unit (1) for an injection-molding device for processing thermoplastic, thermosetting or elastomeric material, in which there is arranged between two fixed platens (3, 4), kept at a distance by means of tie bars (2), a platen (5) which can be displaced in relation to said fixed platens, part of an injection mold (6, 7) respectively being arranged on one of the fixed platens (3) and on the displaceable platen (5), it being possible for a force generating element (8), which generates the clamping force, to be arranged between the one fixed platen (4) and the displaceable platen (5), and the tie bars (2) being arranged in vertical alignment (V), wherein the force generating element (8) is fastened to the displaceable platen (5) and wherein on the one fixed platen (4) there is arranged a locking element (9) which, in a controlled manner, either forms a stop (10) for the force generating element (8) on the one fixed platen (4) or exposes an opening (11) for at least part of the force generating element (8) to enter or pass through the one fixed platen (4).

The force generating element (8) is suitably a hydraulic piston-cylinder system. A cylinder (12) of the force generating element (8) is connected to the displaceable platen (5) and the piston (13) of the force generating element (8) extends vertically downward in an axial direction (14) of the force generating element (8). The end of the piston (13) arranged at the bottom in the vertical direction (V) is formed for bearing against a stop (10) of the locking element (9).

The locking element (9) takes the form of a plate and is mounted displaceably in the horizontal direction (H) in a guide (15). The locking element (9) is able to be moved between a closed position (A) and an opened position (B) by driving means (16). The driving means (16) take the form of electric driving means, or a hydraulic driving means. Furthermore, the driving means (16) are formed for moving into the closed position (A) or the opened position (B) in a speed-controlled and/or position-controlled manner. The locking element (9) is composed of at least two detachable part-elements, so that the effective height of the locking element (9), measured in the vertical direction (V), can be changed.

Suitably, the displaceable platen (5) is equipped with means for cooling 18.

LIST OF DESIGNATIONS

1 clamping unit
2 tie bar
3 fixed platen
4 fixed platen
5 displaceable platen
6 part of the injection mold
7 part of the injection mold
6,7 injection mold
8 force generating element
9 locking element
10 stop
11 opening
12 cylinder of the force generating element
13 piston of the force generating element
14 axial direction
15 guide
16 driving means
17 movement element
18 Cooling means
V vertical direction
H horizontal direction
A closed position
B opened position

The invention claimed is:

1. A clamping unit for an injection-molding device for processing thermoplastic, thermosetting or elastomeric material, comprising:

tie bars arranged in vertical alignment, a displaceable platen arranged between two fixed platens, an upper fixed platen and a lower fixed platen, kept at a distance by means of the tie bars, one half of an injection mold arranged on the upper fixed platen and the other half of the injection mold arranged on the displaceable platen, a single centrally located force generating element arranged between the lower fixed platen and the displaceable platen and fastened centrally to the displaceable platen, a movable locking element on the lower fixed platen which, in a controlled manner, either forms a stop for the force generating element on the lower fixed platen or exposes an opening for at least part of the force generating element to enter the lower fixed platen;

wherein the force generating element is a hydraulic piston-cylinder system, comprising: a single cylinder connected to the displaceable platen and a single piston extending vertically downward in an axial direction from the cylinder;

the locking element is a plate and is mounted displaceably in the horizontal direction in a guide;

the opening is formed centrically in the lower fixed platen for the entry of the piston; and the lower fixed platen rests on a shop floor without a pit thereunder.

2. The clamping unit as claimed in claim 1, wherein the end of the piston arranged at the bottom in the vertical direction is formed for bearing against the stop of the locking element.

3. The clamping unit as claimed in claim 2, wherein the locking element is able to be moved between a closed position and an opened position by driving means.

4. The clamping unit as claimed in claim 3, wherein the driving means is an electric driving means.

5. The clamping unit as claimed in claim 3, wherein the driving means is a hydraulic driving means.

6. The clamping unit as claimed in claim 3, wherein the driving means is a controlled moving element which moves to a closed position or an opened position in a speed-controlled and/or position-controlled manner.

7. The clamping unit as claimed in claims 4, wherein the driving means is a controlled moving element which moves to a closed position or an opened position in a speed-controlled and/or position-controlled manner.

8. The clamping unit as claimed in claims 5, wherein the driving means is a controlled moving element which moves to a closed position or an opened position in a speed-controlled and/or position-controlled manner.

9. The clamping unit as claimed in claim 1, wherein, the locking element is composed of at least two detachable part-elements, so that the effective height of the locking element, measured in the vertical direction is changed.

10. The clamping unit as claimed in claim 1, wherein the displaceable platen has a means for cooling.

* * * * *